(12) United States Patent (10) Patent No.: US 7,546,317 B1
Kaptelinin (45) Date of Patent: Jun. 9, 2009

(54) LOW-OVERHEAD INTEGRATED SUPPORT FOR PERSONAL PROJECT MANAGEMENT

(76) Inventor: Viktor Kaptelinin, Mariehemsvägen 13A, Umeå (SE) SE-906 54

( * ) Notice: Subject to any disclaimer, the term of this patent is extended or adjusted under 35 U.S.C. 154(b) by 732 days.

(21) Appl. No.: 10/691,445

(22) Filed: Oct. 22, 2003

Related U.S. Application Data

(60) Provisional application No. 60/421,376, filed on Oct. 24, 2002.

(51) Int. Cl.
*G06F 17/00* (2006.01)
(52) U.S. Cl. .................. 707/200; 707/204; 707/205; 705/6; 705/7; 705/8; 705/9
(58) Field of Classification Search .................. None
See application file for complete search history.

(56) References Cited

U.S. PATENT DOCUMENTS

| 5,890,131 | A | * | 3/1999 | Ebert et al. | .................... | 705/7 |
| 5,951,642 | A | * | 9/1999 | Onoe et al. | .................... | 709/224 |
| 6,631,496 | B1 | * | 10/2003 | Li et al. | .................... | 715/501.1 |
| 2003/0135565 | A1 | * | 7/2003 | Estrada | .................... | 709/206 |

OTHER PUBLICATIONS

Dourish, P. et al., "An Experimental Architecture for Fluid Interactive Document Spaces", ACM TOCHI, 6(2), 1999.
Fertig, S. et al., "An Alternative to the Desktop Metaphor", CHI'96 Conference on Human Factors in Computing Systems, Video Program (Vancouver, Canada, Apr. 1996).
Fertig, S. et al., "Finding and Reminding", Reconsidered. SIGCHI Bulletin, v.28, Jan. 1996.
Henderson, A., et al., "Rooms: The use of virtual workspaces to reduce space contention in a window-based graphical user interface", ACM Transactions on Graphics, 5(3) 1986.
Kaptelinin, V., "Creating Computer-Based Work Environments: An Empirical Study of Macintosh Users", Proceedings of the ACM SIGCPR/SIGMIS'96 Conference (Denver, Colorado, Apr. 11-13, 1996).
Kaptelinin, V., "Supporting Higher-Level User Actions with Representations of Project Contexts and Interaction Histories", Working Paper. Dept. of Informatics, Umeå Univ. 1997.
Kaptelinin, V., "UMEA User-Monitoring Environment for Activities", Conference companion, UIST'02 Annual Symposium (Paris, France, Oct. 27-30, 2002).

(Continued)

*Primary Examiner*—Khanh B Pham

(57) ABSTRACT

The present invention relates to a method and apparatus for providing low-overhead support for task and information management provided to users of computer systems. Before starting to work on a project a user selects the project as active, and lists of resources employed by the user when working on the project are created on the basis of information about the subsequent computer system events generated by user's actions. The user can access lists of resources when he or she selects the project again. According to preferred embodiments, a database containing a project-tagged interaction log is created through means of the computer system, and the user is provided with a number of personal information management (PIM) tools, such a calendar, a to do list, and a notepad. Information entries created with the PIM tools are linked to active projects. Interaction log is utilized to delete irrelevant resources and make more important information more accessible than less important information.

34 Claims, 7 Drawing Sheets

OTHER PUBLICATIONS

Kaptelinin, V., "UMEA: Translating interaction histories into project contexts", Proceedings of CHI 2003 Conference on Human Factors in Computing Systems (Fort Lauderdale, Florida, Apr. 5-10, 2003).

Nardi, B. et al., "Integrating communication and information through ContactMap", CACM, 45(4), 2002.

Robertson, G. et al., "The Task Gallery: A 3D Window Manager", Proceedings CHI 2000 Conference on Human Factors in Computing Systems (The Hague, The Netherlands, Apr. 1-6, 2000).

Shapiro, D., "Technologies for self-organization", In: Dittrich, Y., Floyd, C., Jayaratna, N., Kensing, F., and Klischewski, R. (eds.) Social Thinking-Software Practice. Dagstuhl Seminar Report (Dagstuhl, Germany, Sep. 1999).

Window Managers for X: The Basics. Available at; http://www.plig.org/xwinman/basics.html.

* cited by examiner

# LOW-OVERHEAD INTEGRATED SUPPORT FOR PERSONAL PROJECT MANAGEMENT

CROSS-REFERENCE TO RELATED APPLICATION

This application claims the benefit of priority from U.S. Provisional Application Ser. No. 60/421,376 filed Oct. 24, 2002.

TECHNICAL FIELD

The present invention pertains to a method and an apparatus for task and information management by users of computer systems. More specifically, it pertains to a method and an apparatus for providing a low over-head integrated support for information management to a user of a computer system.

BACKGROUND ART

Users of computer systems carry out two types of activities: tasks and projects. Tasks are lower-level user activities supported by a computer application. Sets of tasks, which can be carried out with an application, are determined by the functionality of an application. A user can select a task from the range of tasks supported by an application and then accomplish the task by performing a pre-determined operation or a sequence of operations. Examples of tasks are saving a file on a disc, sending an email message to a certain address, or changing the font of a certain part of a text document. Projects, on the other hand, are higher-level user activities, which can be described independently of the functionality of a computer application. Examples of projects are planning a trip, creating a digital photo album, or writing and submitting a paper to a conference. To carry out a project a user typically has to use several types of computer applications, set up and manage a project-specific work context (organize necessary resources to make them readily available when working on the project), and often coordinate computer and non-computer activities. For instance, to prepare and submit a conference paper a user may need a word processor to write the paper, an email program to follow announcements and updates, and a web browser to upload the paper. The paper can be located as a text file in a folder named "Conferences", email messages can be stored in a mailbox also named "Conferences", and the conference website bookmark can be placed into a bookmark folder, once again, named "Conferences". In other words, users may have several information hierarchies within their virtual work environments—for example, a file system, a mailbox system, and a bookmark system,—which contain thematically related items but are independent from each other. To complete a project that utilizes several types of information objects, a user has to locate appropriate resources in each of these systems separately and find a way to coordinate them.

Standard computer systems, such as operating systems based on the desktop metaphor, including MS Windows and Mac OS, provide little support for managing project contexts, especially when projects span several applications and involve various types of information objects.

This problem has been recognized by designers of computer systems and a number of approaches to address this problem have been proposed. These approaches can be divided into three main categories: personal information management systems, dedicated project spaces, and non-hierarchical information space architectures.

Personal information management (PIM) systems, such as Microsoft Outlook, Palm Desktop, or ACT!, provide electronic versions of traditional organizer tools: calendars, address books, To Do lists, etc. A limitation of PIM tools is that management of activities is separated from management of work objects, such as files and applications, necessary to carry out these activities. When a project is described with a PIM system, the description does not support finding and arranging resources for this particular project.

Dedicated project spaces are spatially defined subsets of a virtual work environment, which provide contexts for individual projects or types of tasks. Creating a project folder is a common and the most basic way to create a dedicated project space. A number of systems have been developed to provide users with more elaborated spaces. The ROOMS system [4] allows a user to set up specialized workspaces ("rooms") containing resources necessary to carry out different types of activities. The basic approach underlying the ROOMS system, that is, allocating virtual spaces to individual projects, where users can place tools and materials and thus build a special-purpose work environment, has been implemented in a number of more recent systems. The Task Gallery [10] provides users with task windows presented as canvas hanging on the walls of a virtual 3D gallery. Another example is Manufaktur, a collaborative 3D workspace intended to support design professionals in creating and maintaining the context of a task or project [11].

The main problem with dedicated project spaces is overhead. A user has to set up an environment for a project, arrange necessary resources, and regularly update them. When the project is finished, a user may have to clean up the space. The overhead associated with dedicated project spaces can be an obstacle to using a system, especially because a user typically has to invest time and effort before enjoying any benefits of using the system.

Overhead can be the main reason why many systems for creating dedicated project spaces have not become widely used. An exception is window managers for X, such as fvwm, which support multiple workspaces. However, these workspaces are intended for various types of activity, for instance handling email, reading news, or word processing, rather than individual projects [12].

Another common problem with dedicated project spaces is that they typically do not support certain types of information objects. For instance, if a user sets up a folder for a project he or she can get an easy access to applications and documents but not email messages or To Do lists related to the project. One of the few systems capable of integration, at least partial, of different types of information objects is ContactMap [9], which provides an information access through the structure of user's electronic communication. Since there is usually a mapping between patterns of communication and patterns of user activities in general, ContactMap, indirectly, can create project contexts integrating regular files with various types of electronic communications related to a project.

Both personal information management systems and dedicated project spaces have been developed as extensions of the traditional architecture of desktop environments, based on the hierarchical file system. Radically different approaches to creating project contexts have been employed in non-hierarchical architectures of information spaces, such as provided by Lifestreams [2, 3] and Presto [1].

The Lifestreams system organizes documents according to their chronological order. A user can create "sub-streams" of documents by entering selection criteria. This approach provides a simple and intuitive way to organizing and finding documents in personal electronic spaces. People often associate events with certain time periods; so knowing the approximate time of an event can help identify the fragment of the Lifestreams sequence, which contains the target document. The system also has the advantage of combining document space management with management of individual and group activities. For instance, a draft paper to be discussed by a group of co-authors can be placed at a certain time in the future, which can facilitate either access to necessary resources or coordination of group work.

Presto [1] has been developed within the framework of the Xerox PARC Placeless Documents project. The system provides an infrastructure that allows for flexible and dynamic generation of collections of documents by defining appropriate sets of attributes.

Both Lifestreams and Presto are intended to support creating complex information structures that match certain criteria and can include various types of resources. These structures are dynamically generated as a result of computation conducted on the whole collection of available information. Both systems can in principle be employed to create project-specific workspaces containing various types of information. However, to create a project context a user has to define formal criteria for selecting relevant information, which in many cases can be difficult or even impossible to do.

Users, especially in the beginning of a project, often have a vague idea of which attributes are important. The set of criteria according to which information should be considered relevant may develop over the course of working on a project. Besides, these criteria are likely to be implicit, and even if the criteria are clear and explicit, using them could require an excessive effort. For instance, when working on a project a user might come across a potentially useful email address. It is typically much easier to simply add the address to information related to the project than to find selection criteria, according to which the system would be able to automatically generate a "sub-stream" or a document collection that would include the address. Therefore, a potential problem with non-hierarchical architectures is a lack of support for situated and opportunistic work practices and tacit knowledge of a user.

In an earlier work by the author of this invention it was proposed that visual representations of interaction histories can be employed by a user to manually create collections of windows, the so-called "project contexts", so that each of these collections can be opened, closed, edited, or saved, as a single object [5, 6]. This approach makes it possible to somewhat decrease user's overhead, because a user can work with groups of documents, rather than individual documents, and link them to projects. However, this approach is still associated with significant overhead, because it implies that a user creates and continually maintains project contexts manually.

Therefore, the existing, prior art, computer systems evidently do not provide enough support for users to carry out projects (higher-level activities). More specifically, they do not provide low-overhead support for integrating multiple information hierarchies in the digital work environment.

The disclosed invention addresses this problem by proposing a novel method and apparatus. A computer system based on the disclosed invention was implemented and reported by the author at recent international conferences in the area of Human-Computer Interaction, UIST'02 (Paris, October 2002) and CHI'03 (Ft. Lauderdale, April 2003) [7, 8].

REFERENCES

1. Dourish, P., Edwards, W. K., LaMarca, A., Salisbury, M. Presto: An Experimental Architecture for Fluid Interactive Document Spaces. *ACM TOCHI,* 6 (2), 1999.
2. Fertig, S., Freeman, E., Gelernter, D. Lifestreams: An Alternative to the Desktop Metaphor. *CHI'96 Conference on Human Factors in Computing Systems. Video Program* (Vancouver, Canada, April 1996).
3. Fertig, S., Freeman, E., Gelernter, D. "Finding and Reminding" Reconsidered. *SIGCHI Bulletin*, v. 28, January 1996.
4. Henderson, A., Card, S. K. Rooms: The use of virtual workspaces to reduce space contention in a window-based graphical user interface. *ACM Transactions on Graphics,* 5 (3), 1986.
5. Kaptelinin, V. Creating Computer-Based Work Environments: An Empirical Study of Macintosh Users. *Proceedings of the ACM SIGCPR/SIGMIS'96 Conference* (Denver, Colo., Apr. 11-13, 1996)
6. Kaptelinin, V. *Supporting Higher-Level User Actions with Representations of Project Contexts and Interaction Histories*. Working Paper. Department of Informatics, Umea University, 1997.
7. Kaptelinin, V. UMEA: User-Monitoring Environment for Activities. *Conference companion, UIST'02 Annual Symposium* (Paris, France, Oct. 27-30, 2002)
8. Kaptelinin, V. UMEA: Translating interaction histories into project contexts. Proceedings of CHI 2003 Conference on Human Factors in Computing Systems (Fort Lauderdale, Fla., Apr. 5-10, 2003)
9. Nardi, B., Whittaker, S., Isaacs, E., Creech, M., Johnson, J., Hainsworth, J. Integrating communication and information through ContactMap. *CACM,* 45 (4), 2002.
10. Robertson, G., van Dantzich, M., Robbins, D., Czerwinski, M., Hinckly, K., Risden, K., Thiel, D., Gorokhovsky, V. The Task Gallery: A 3D Window Manager. *Proceedings CHI* 2000 *Conference on Human Factors in Computing Systems* (The Hague, The Netherlands, Apr. 1-6, 2000).
11. Shapiro, D. Technologies for self-organization. In: Dittrich, Y., Floyd, C., Jayaratna, N., Kensing, F., and Klischewski, R. (eds.) *Social Thinking—Software Practice. Dagstuhl Seminar Report* (Dagstuhl, Germany, September 1999).
12. Window Managers for X: The Basics. Available at: http://www.plig.org/xwinman/basics.html

SUMMARY OF THE DISCLOSED INVENTION

The present invention relates to a method and an apparatus for providing low-overhead support for integrating various types of project-specific information.

Objects of the invention according to the method and apparatus are to support personal project management by: (a) making it possible for a user to directly indicate a higher-level task, or project, (b) monitoring user activities and tracking resources used when carrying out the project, (c) organizing and updating these resources to make them easily available to the user when he or she returns to the project, and (d) providing personal information management tools linked to individual projects.

To achieve aims and objectives the present invention provides a method providing low-overhead integrated support for information management for a user of a computer system. The method comprises the steps of:

creating a memory storage containing individual descriptions of each project listed in a group of projects, each description comprising one or more properties, said properties selected from a group consisting of at least: name, deadline, color, icon, status, importance, and urgency; said storage also containing descriptions of information objects related to each project listed in said group of projects; said information objects selected from a group consisting of at least: computer files and folders, computer applications, electronic documents and their parts, web pages, computer network addresses, electronic messages, computer network transmissions, computer network connections, computer device descriptions, computer preferences and settings, user identities, user profiles and accounts, computer system-generated reports and collections, user interface components, virtual reality objects, electronic images, computer models, and personal information management system entries;

indicating one project of said group of projects as an active project;

detecting, through a first detecting means, an event generated by one of at least one computer application and at least one operating system when a user-action is carried out with at least one information object, the user-action selected from a list consisting of at least: creating, deleting, activating, inactivating, selecting, deselecting, opening, closing, viewing, sending, receiving, downloading, uploading, accessing over network, sharing, archiving, printing out, playing, pausing, saving, copying, moving, modifying, or editing said at least one information object;

detecting, through a second detecting means, a project, which is active at the time when said event is generated;

detecting, through a third detecting means, whether at least one of the information objects described in said event is contained in a list of information objects related to said active project:

and if said at least one information object described in said event is not contained in said list of information objects related to said active project, then adding a description of said at least one information object to said list of information objects related to said active project;

viewing and editing lists of project-related information objects;

opening an information object from a list of project-related information objects;

whereby an organization and accumulation of information objects related to individual projects of a user is accomplished in the computer system, thus enabling the user to directly access project-related information objects when work on a project is resumed after an intermission.

One embodiment of the method according to the present invention comprises detecting an event generated upon a user-action being carried out through first detecting means and through second detecting means further detecting which project is active when the event is generated and further comprising the step of:

creating an entry to a database containing interaction history, the entry comprising at least: time of the event, type of user-action, information object or objects used, and the project, which is active at the time of the event;

whereby identifying a sub-set of entries in the interaction history database, linked to an individual project, enables a user to update, modify, or generate a list of information objects related to the individual project, through an updating, modifying, or generating means.

Another embodiment of the method according to the present invention comprises viewing and editing entries in the interaction history database.

A further embodiment of the method according to the present invention comprises editing of entries in the interaction history database through manual editing or algorithm-based processing, and storing both unedited and edited versions of the interaction history in a computer memory.

Yet a further embodiment of the method according to the present invention comprises visualizing information in the interaction history database as statistical charts and timeline or timelines.

In yet another embodiment of the method according to the present invention, a database containing interaction history is processed by converting a pre-processed sequence of three or more identical events into a processed sequence, wherein the processed sequence contains the first and the last events of the pre-processed sequence.

Yet another embodiment of the method according to the present invention comprises the steps of:

assigning ranks to project-related resources, wherein resources accessed with a frequency, which exceeds a predetermined value, are assigned a higher rank than a default rank assigned to a resource accessed once; and edited and saved documents, bookmarked web pages, manually entered URLs, messages marked as important, renamed folders, and folders, in which files are saved, are assigned a still high rank; and resources opened for less than a first predetermined amount of time are assigned a rank, lower than a default rank assigned to a resource accessed once; and resources not used for more than a second predetermined amount of time are assigned a rank, lower than a default rank assigned to a resource accessed once; and selectively displaying resources with predetermined ranks as directly displayed on lists of project-related resources and other resources being displayed, indirectly, if an additional operation is carried out; and setting options for directly and indirectly displaying project-related resources with different ranks.

A further embodiment of the method according to the present invention comprises viewing and editing a part of the interaction history database related to an indicated project-related resources, such as a file, a computer folder, a URL, a message, or an email address, said part of the interaction history database displayed as a text, a statistical chart, or timeline diagram representing the use of the indicated resource in one or several projects.

Still another embodiment of the method according to the present invention comprises the step of:

displaying visual clues indicating how long ago a project was worked on the last time.

An additional embodiment of the method according to the present invention comprises the step of:

providing a personal information management system comprising tools selected from the group consisting of at least: calendar, To Do lists, and notes; wherein entries to the personal information management system are linked to projects, which are active when the entries are being made.

A yet further embodiment of the method according to the present invention comprises the steps of:

displaying one of a minimized and a maximized view of project description and personal information management tools; and selectively switching between the minimized and the maximized views.

Another embodiment of the method according to the present invention comprises displaying project-related information in a calendar in a color associated with a given project.

A further embodiment of the method according to the present invention comprises creating a description of a project and further comprises the steps of:

creating a description of parts of the project or subtasks; and marking one of the subtasks as the active subtask.

An additional embodiment of the method according to the present invention comprises the steps of:

relating project-related resources and personal information management system entries to specific subtasks; and if no subtask is selected, then displaying all project-related resources and personal information management system entries, and if a subtask is selected, then displaying only those project-related resources and personal information management system entries, which are related to the subtask.

A further embodiment of the method according to the present invention comprises the steps of:

providing personal information management tools selected from the group consisting of at least: calendar, To Do lists, and notes; wherein entries to the personal information management system are linked to projects, which are active when the entries are being made; and creating an entry to a database containing interaction history when a user-action is carried out with an information object, wherein the entry at least comprises one of: time of the event, type of user-action, information object or objects used, and the project, which is active at the time of the event.

Yet a further embodiment of the method according to the present invention comprises the steps of:

generating, through a document generating means, a document containing a description of a specific project, the project description containing types of information selected from a group consisting of at least: project name, project deadline, a description of project color, a description of project icon, a list of project's sub-projects with their respective deadlines, whether the project is completed or not, names of project-related files and folders, a list of project-related URLs, a list of project-related email addresses, headers of recent or all messages sent within the project, list of all or recent events in project's interaction history, a statistical description of project's interaction histories, project-related notes and To Do entries, project-related calendar entries; and selectively defining, which types of information to be included in a project description.

A yet further embodiment of the method according to the present invention comprises the step of:

coloring areas of a calendar view representing time units, such as days, weeks, or months, of a predetermined period in the past with colors associated with the projects worked on during the time units, wherein the proportion of the area colored in a project's color is substantially proportional to the amount of time spent on that project.

Another embodiment of the method according to the present invention comprises the steps of:

detecting the subset of project-specific resources of an active project, which are open at the moment when the project becomes not active; and storing a description of the subset of project-related resources in computer memory; and when the project becomes active again, providing means for the opening the subset of project-related resources relating to the memory-stored description.

Yet another embodiment of the method according to the present invention comprises the steps of:

creating at least one computer folder, and moving or copying all or part of project-related computer files and folders to the at least one computer folder, or placing shortcuts to all or part of project-related computer files and folders to the at least one computer folder.

Still another embodiment of the method according to the present invention comprises the step of:

organizing all or part of project-related information objects related to one or more projects, copies of the information objects, or links to the information objects, in at least one predetermined computer folder for subsequent distribution of work between several devices, which at least one work distribution computer folder is then copied to a memory storage device, sent over a computer network, or synchronized with another computing device; and wherein the work on a project is coordinated employing a variety of computer devices.

An additional embodiment of the method according to the present invention comprises the steps of:

detecting if new resources were added to existing resources or were updated in the at least one work distribution computer folder; and if there are new or updated resources in the at least one work distribution computer folder, then adding, creating or updating events to a interaction history database and updating lists of project-related resources.

Further an embodiment of the method according to the present invention comprises the steps of:

organizing project-related resources into resource sets, the resource sets being selected from the group consisting of at least: applications, documents, folders, URLs, messages, and contacts; and viewing and editing the resource sets separately.

Yet a further embodiment of the method according to the present invention comprises the step of:

indicating a set of information objects, which information objects should be ignored and not added to lists of project-related resources when an action involving one or more resources from the set of resources is carried out.

Yet another embodiment of the method according to the present invention comprises the steps of:

marking a project-related resource or resources as bound to a specific project; and activating the specific project when a linked resource is selected.

Yet an embodiment of the method according to the present invention comprises marking a project-related resource or resources as bound to a specific project and further comprises the step of:

displaying, when a bound information object is selected, a dialog window and providing a possibility for selecting one of the at least three options: (a) making the project, to which the bound resource is linked, active, (b) accessing the bound resource without making changes as to which project is active, and (c) canceling access to the bound resource.

A further embodiment of the method according to the present invention comprises the steps of:

assigning ranks to project-related resources; and displaying lists of project-related resources so that resources having the same rank are displayed as grouped together.

In an additional embodiment of the method according to the present invention, items on lists of project-related resources are displayed as objects located in a two-dimensional or three-dimensional space.

The present invention further sets forth an apparatus providing a low-overhead integrated support for information management for a user of a computer system. The apparatus comprises:

memory-storage creating means for creating memory storage containing descriptions of a group of projects, wherein the descriptions comprise one or more properties, wherein the properties are selected from a group consisting of at least: name, deadline, color, icon, status, importance, and urgency; said memory storage containing a description of information objects related to the project in a list of project-related resources; said information objects being of a type selected from a group consisting of at least: computer files and folders, computer applications, electronic documents and their parts, web pages, computer network addresses, electronic messages, computer network transmissions, computer network connections, computer device descriptions, computer preferences and settings, user identities, user profiles and accounts, computer system-generated reports and collections, user interface components, virtual reality objects, electronic images, computer models, and personal information management system entries;

means for indicating one project from the group of projects as an active project;

first detecting means for detecting an event generated by one of at least one computer application and at least one operating system when a user-action is carried out with an information object, the user-action is selected from a list consisting of at least: creating, deleting, activating, inactivating, selecting, deselecting, opening, closing, viewing, sending, receiving, downloading, uploading, accessing over network, sharing, archiving, printing out, playing, pausing, saving, copying, moving, modifying, or editing said information object;

second detecting means for detecting a project, which is active at the time when the event is generated;

third detecting means for detecting whether descriptions of at least one of the information objects described in the event are contained in a list of project-related resources associated with the active project;

and if the at least one information object described in the event is not contained in the list of information objects related to the active project, then adding descriptions of the at least one information object to the list of information objects related to the active project;

means for viewing and editing lists of project-related information objects;

means for opening an information object from a list of project-related information objects.

One embodiment of the apparatus according to the present invention comprises personal information management system tools selected from the group consisting of at least: calendar, To Do lists, and notes; wherein entries to the personal information management system are linked to projects, which are active at the time the entries are being made.

Another embodiment of the apparatus according to the present invention comprises means for creating an entry to a database containing interaction history when a user-action is carried out, wherein the entry comprises at least: time of the event, type of user-action, information object or objects used, and the project, which is active at the time of the event.

A further embodiment of the apparatus according to the present invention comprises means for viewing and editing entries in the interaction history database.

Another embodiment of the apparatus according to the present invention comprises means for detecting the subset of project-specific resources of an active project, which are open at the moment when the project becomes not active; and means for storing a description of the subset of project-related resources in a computer memory; and when the project becomes active again, providing means for opening the subset of project-related resources described in the memory-stored description.

Yet a further embodiment of the apparatus according to the present invention comprises means for creating at least one computer folder linked to a certain project and moving or copying all or part of project-related files to the at least one computer folder, or placing shortcuts to all or part of project-related files to the at least one computer folder.

Yet another embodiment of the apparatus according to the present invention comprises means for creating a memory storage and storing all or part of resources related to one or several projects in the storage; and means for copying, moving, or sending information contained in the storage to another memory storage, another computing device, or a computer network;

wherein a user, more conveniently, can store and access information necessary for working on a project or projects while employing a variety of computer devices.

BRIEF DESCRIPTION OF THE DRAWINGS

Henceforth reference is had to the attached figures for a better understanding of the present invention and its examples and embodiments, wherein.

DETAILED DESCRIPTION OF PREFERRED EMBODIMENTS

The present invention sets forth a method and an apparatus for providing low-overhead support for integrating various types of project-specific information.

The present invention can be implemented in a wide variety of computer-related systems. Herein follows a description of preferred embodiments of the invention.

Figure 1:
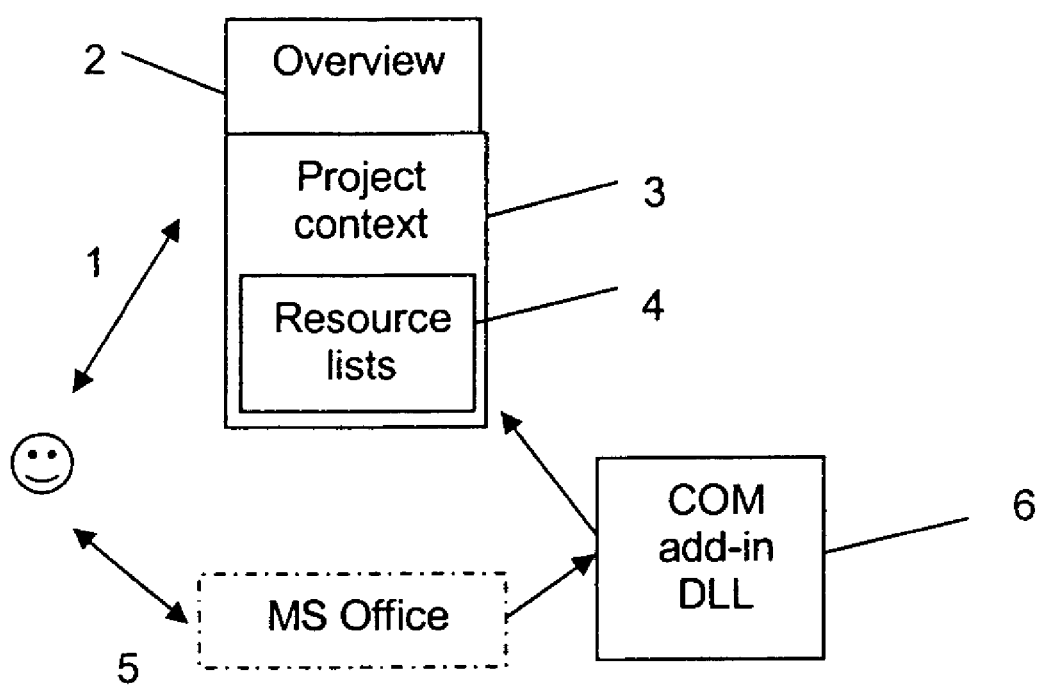
FIG. 1 schematically illustrates a general system architecture, according to a first preferred embodiment of the present invention.

FIG. 1 depicts a schematic architecture of a computer system in accordance with a first preferred embodiment of the present invention. The computer system is either in a foreground mode 1 or a background mode 5. In the foreground mode 1 a user interacts directly with the computer system. The computer system, through comprised means such as specially adapted software, allows the user to view a list of projects 2 and select one of the existing projects as active, to set up a new project or change details 3 of existing projects, and to open a resource, such as a document, a folder, a web page, or a contact from a project-specific list of resources 4.

Project-related resources can potentially include a wide variety of information objects, that is, units of information a user can indicate, for instance, by typing a name of an information object, by selecting it from a list, or by pointing to its location in a two-dimensional or three-dimensional space. The types of information objects may include, for instance, computer files and folders, computer applications, electronic documents and their parts, web pages, computer network addresses, electronic messages, computer network transmissions, computer network connections, computer device descriptions, computer preferences and settings, user identities, user profiles and accounts, computer system-generated reports and collections, user interface components, virtual reality objects, electronic images, computer models, and personal information management system entries. The range of actions a user can carry out with an information object is also wide; it may include, for instance, creating, deleting, activating, inactivating, selecting, deselecting, opening, closing, viewing, sending, receiving, downloading, uploading, accessing over network, sharing, archiving, printing out, playing, pausing, saving, copying, moving, modifying, or editing an information object.

In the context of the present invention the term "list" in expressions "lists of resources," "lists of information objects." and the like, is understood broadly, as any organized visual representation of a set of information objects, the set consisting of one or more information objects, through which representation the user can view the set of information objects, select an information object or information objects, and perform a predetermined action with said information object or information objects.

When the computer system runs in the background mode 5, it detects events generated by an operating system or computer applications when a user uses various applications and operating system facilities Upon detecting an event, one or several resources implicated in a user action causing the event are identified. If identified resources are not contained in project-specific lists of resources associated with the currently active project, they are added to a project-specific list of resources associated with the currently active project. It is appreciated that the system depicted in FIG. 1 may function to create auxiliary files to store project details, user preferences, lists of resources, and so forth. It is also appreciated that memory storage containing various types of information related to projects can be organized either as a single storage or as a collection of several sub-storages. For instance, one or more separate files can be set up for each project and for each type of project related information, such as project details and lists of project-related resources.

Figure 2:
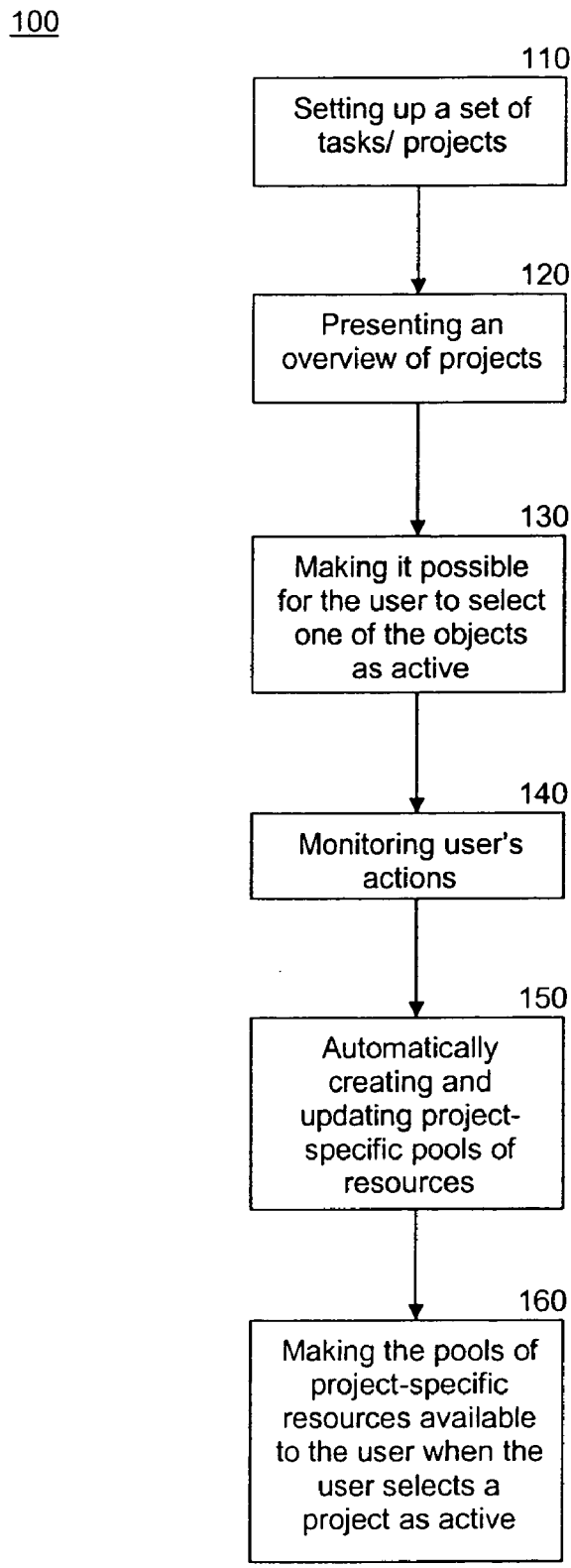
FIG. 2 in a block diagram schematically illustrates a high-level method, according to the first preferred embodiment of the present invention.

FIG. 2, in a flowchart, depicts a method 100 in accordance with the first embodiment of the present invention. A user is initially 110 provided with means for setting up a set of projects in a way similar to setting up tasks or To Do items in existing systems, such as Microsoft Outlook. For instance, to set up a new project the user clicks on a "New Project" button displayed in the application window on a computer screen and is after that presented with another window, in which project name and other attributes (see also, FIG. 10) are entered. Project properties defined by a user when describing a project may include, for instance, the name of the project, its deadline or deadlines, its status, its category, urgency, importance, associated color or icon, individual sub-tasks, its role within a larger-scale project, requirements, description of the people involved and their roles, and so forth. When a project is set up, a new memory storage is created for the project. It is appreciated that "creating" a memory storage is understood as in a broad sense. For instance, it may be accomplished through allocating a part of existing memory storage to the project. A part of a memory storage of a project is intended to store information about project-related resources (thereafter, "project-specific lists of resources"). Initially project specific lists of resources are empty or contain only predetermined default resources.

Figure 9:
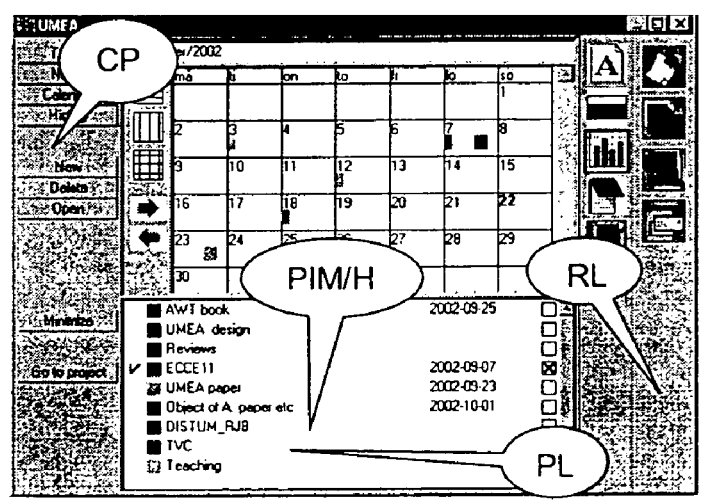
FIG. 9 schematically illustrates a user interface layout, according to the fourth preferred embodiment of the present invention.

Thereafter an overview 120 of projects is presented to the user through display on a computer screen of descriptions of the projects (see also FIG. 9). According to the first preferred embodiment the overview has the form of a list. However, it can be a collection of icons, a configuration of windows, a menu, etc. The overview includes individual features of the project, such as icons or names of the projects (complete or abbreviated), colors, etc, or their combinations. The overview is either always present on the screen or appears thereupon when the user requests it, or it is displayed in another way known to those skilled in the art.

In step 130 the user selects one of the projects as active by using an input device or devices for (a) indicating a project description displayed on a computer monitor and (b) marking the project description by using the same or another input device. Such a selection is, for instance, made by clicking on the name of the project on a list, clicking on an icon, selecting a project from a pop-up menu, etc. Other ways of selecting a project as active are obvious to those skilled in the art. When a project is selected, information about this project (for instance, its name or an ordinal number) is stored in a computer memory.

In step 140 user's actions are monitored as follows. The application or a separate program, or any combination of the main application or applications and other program or programs, is used to monitor the user-actions. Descriptions of actions carried out by a user are received by the computer system. The descriptions are time stamped and describe types of actions and types of objects used, for instance, printing a specific document. There are a variety of ways to monitor a user. According to the first preferred embodiment, Microsoft Office 2000 events (opening a web page, printing a file, sending an email, etc.) are detected through a COM add-in DLL 6 implemented as an IDTExtensibility2 object. However, many other ways to monitor user actions and identify which resources are used within these actions are known to those skilled in the art. Low-level system events, such as keystrokes or mouse clicks, can be registered. These low-level events can be analyzed in ways obvious to those skilled in the art to infer user actions and identify objects implicated in these actions. Modern computer systems also provide a possibility for more direct monitoring of user actions, such as detecting Microsoft Office events, mentioned above. Besides, many applications running in the Mac OS environment generate so-called "apple events", which are used, for instance, for recording macros. These events can also be used for monitoring user actions. Besides, some computer applications can be specially designed to generate events of a certain type to work successfully with computer systems of the kind disclosed in the present invention. Other possible ways of monitoring a user and detecting user actions on the basis of system events generated by a computer system when a user carries out an action, are known to those skilled in the art, for example as taught in U.S. Pat. No. 5,793,948, hereby incorporated herein in its entirety by reference.

In step 150 project-specific lists of resources are updated as follows. Information object (or information objects), indicated in a description of the user action, detected in step 140, that is, information objects implicated in the user action, are identified. Event descriptions have a predetermined format: <action type><objects><time>. Therefore, detection of implicated objects can be done directly by accessing information contained in appropriate sections of a description. For instance, if printing a document generates an event: <printed><C:\application.doc><2003-09-09 14:25:54>, then C:\application.doc will be identified as an object implicated in the event by accessing the appropriate section of the description.

The currently active project is identified, through accessing information about active project, stored in a computer memory in step 130.

The identified implicated information object or information objects are then compared with the lists of information objects related to the currently active project (for instance, "Project 1") to detect whether or not the implicated objects are contained in the lists of project-related resources. This detection is carried out through a known algorithm, programming subroutine, or programming function. A variety of possible ways to detect whether or not certain information objects are contained in certain project-specific lists of resources are obvious to those skilled in the art.

If an implicated information object is not contained in the project-related lists of resources, the information object is added to an appropriate list. For instance, if using a new document is detected within a project, this document is added to the list of documents, related to the project.

To make using project-related resources more convenient, a list of information objects related to a project can be divided into several separate sub-lists according to types of information objects. In the present preferred embodiment information objects related to an individual project are organized into four separate lists: documents, computer applications, computer folders, and contacts (email addresses).

When a user resumes working on a project after an intermission, the user can conveniently view and open information objects related to the project by displaying a list of information objects related to the project and selecting a resource from the list. The user can display a list of resources by clicking on a user interface component, a button, corresponding to an appropriate list of resources. The result of clicking on the button is displaying a pop-up menu containing a list of information objects.

A user can edit a list of information objects by selecting a command, displayed as a top item on the list of information objects, said command being separated from other items on the list through a separator line and a different font. Selection of the said command displays a new window containing the same list of information objects. The new window allows the user to edit the list of information objects by deleting items, changing items' location on the list by dragging them to a new location, adding new items manually, and assigning ranks to items.

Figure 3:
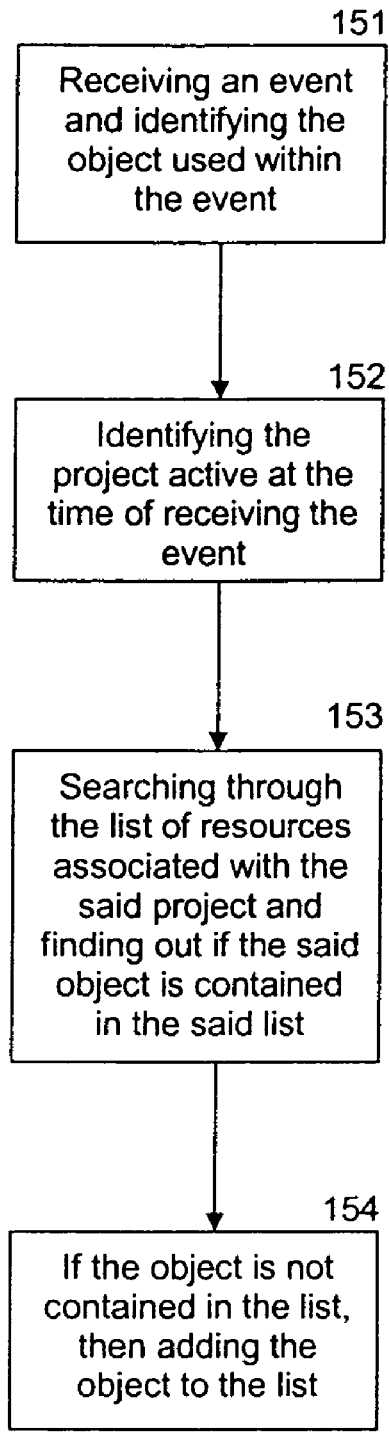
FIG. 3 schematically illustrates a high-level method, according to the first preferred embodiment of the present invention.

FIG. 3 illustrates in a flowchart, a high level description of a method 150*a* for accomplishing the step 150 of the method 100 in accordance with FIG. 2.

Figure 4:
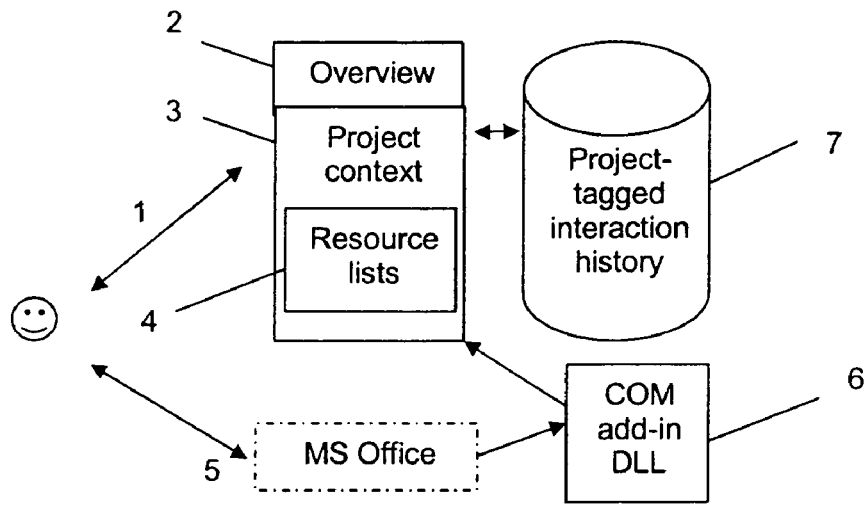
FIG. 4 schematically illustrates general system architecture, according to a second preferred embodiment of the present invention.

FIG. 4 depicts a schematic architecture of a computer system in accordance with a second preferred embodiment of the present invention. The difference between the architecture depicted in FIG. 1 and the architecture depicted in FIG. 4 is that a database 7 is created containing a description of time-stamped events received through a COM add-in DLL 6, and tagged to projects active when the events are received. Besides, the database 7 may contain descriptions of actions carried out by a user in the foreground mode. Examples of such events are: setting up a new project, making a project active, or changing details of a project.

The interaction history contained in the database is displayed to a user, when the user issues an interaction history-displaying command by clicking on an icon located on a computer application toolbar, and the user selectively edits the history by deleting, modifying, or adding information in the computer database by right-clicking on an item in the interaction history and then selecting a command from a pop-up context menu. In particular, the user is able to re-assign an event or a selected sequence of events from one project to another.

The interaction history is used to update, modify, or generate lists of project-specific information objects. When a user re-assigns a range of events from one project to another, a modified database is processed, using an algorithm obvious to those skilled in the art, to establish a new mapping between projects and information objects and thereby update lists of project-related information objects according to changes made by a user. When a user deletes a part of interaction history related to a specific project, processing the interaction history database intended to establish, which objects remain related to the project after the deletion, will modify project-related lists of resources according to the changes made by a user. If a user accidentally deletes descriptions of project-related resources, these descriptions are restored by generating new lists of project-related resources through processing the interaction history database and establishing which information objects are related to which projects.

The interaction history database can be also used for real-time generation of lists of project resources when a user accesses lists of project-related resources, through processing of the interaction history database and establishing which information objects are related to a selected project.

The interaction history is displayed to a user through utilizing a known presentation format, such as a timeline or the like. A user is able to select the time units such as minutes, hours, days, weeks etc., and the period of time e.g., from 12:00 until 15:00 last Friday, the content of the timeline as, for example, all projects, selected projects, one project, certain types of objects, such as PowerPoint presentations, saved objects, or a specific object. The timeline indicates, for instance, by color, which objects have been just opened by a user, and which objects were modified.

A user has also an option of viewing and editing a part of interaction history related to a certain information object by selecting an object and then issuing a history-displaying command. The part of interaction history is displayed as a text, a statistical chart, or timeline diagram representing the use of the said indicated resource in one or several projects. Therefore, a user is able to see when and how often the objects utilized within one project have been utilized also within other projects. Besides, a user can add or delete information in the part of interaction history by right-clicking on displayed information and selecting an "add" or "delete" command from a context menu.

Algorithms are employed to avoid cluttering interaction history with redundant information. The algorithms to this end convert a sequence of identical events into more concise descriptions. Examples of two such algorithms 10 and 20 are shown below:

10
If
event <n> is identical to event <n+1>)
and
(event <n+1> is identical to event <n+2>)
and

```
((time of event <n+2>)–(time of event <n+1>)<BreakTime
then
delete event <n+1>
add 1 to EventCounter(event<n>)
20
If
event <n> is identical to event <n+1>)
and
((time of event <n+1>)–(time of event <n+2>)<BreakTime
then
delete event <n+1>
add 1 to EventCounter(event<n>)
put FirstTime(event <n+1>) into SecondTime (event<n>)
```

Tables 10a, 10b and 20a, 20b, shown below, depict views of a subsequence of event descriptions in an interaction history and their transformations when algorithms 10 and 20 are employed.

TABLE 10a

| | | |
|---|---|---|
| 2002-10-12 12:01 | updated <file1> | 1 |
| 2002-10-12 12:02 | updated <file1> | 1 |
| 2002-10-12 12:03 | updated <file1> | 1 |

TABLE 10b

| | | |
|---|---|---|
| 2002-10-12 12:01 | updated <file1> | 2 |
| 2002-10-12 12:03 | updated <file1> | 1 |

TABLE 20a

| | | |
|---|---|---|
| 2002-10-12 12:01 | updated <file1> | 1 |
| 2002-10-12 12:02 | updated <file1> | 1 |
| 2002-10-12 12:03 | updated <file1> | 1 |

TABLE 20b

| | | |
|---|---|---|
| 2002-10-12 12:01 | updated <file1> | 3 |
| 2002-10-12 12:03 | | |

The algorithms described above and other algorithms obvious to those skilled in the art can be used to process an information history database and create a processed version of the database.

It is appreciated that both processed and unprocessed versions can be stored in computer memory and made accessible to a user.

Interaction histories contain information about the relative importance of the resources used within a project. If a user saves successive versions of a document within a project, it means that the document is probably essential to the project. On the other hand, if a user opens a document only once and closes it immediately after opening, the document is possibly not very important and could even have been opened by mistake. Predetermined high ranks, higher than a default rank assigned to a resource accessed once, are assigned to frequently opened resources, that is, resources accessed with a frequency, which exceeds a predetermined value. Predetermined high ranks are also assigned to resources modified when working on a project, such as edited and saved documents, bookmarked web pages, manually entered URLs, answered messages, messages marked as important, renamed folders, and folders, in which files are saved. On the other hand, resources opened for less than a first predetermined amount of time are assigned a rank, lower than a default rank assigned to a resource accessed once, and so are resources not used for more than a second predetermined amount of time.

Via the ranking means, resources are sorted out by ranks being assigned to them according to computer system software instructions and the most important resources are displayed higher on the list to make them more accessible. Resources with lower ranks are displayed lower on the list. The least important resources can be filtered out from the lists or hidden. A user can set options for displaying resources with different ranks. For instance, a user can set a predetermined rank value so that resources having a rank lower than the predetermined value are not displayed.

As mentioned, events in the interaction history are time-stamped. The amount of time, indicating how long individual projects are not in use, is calculated by subtracting a time of the last event within a project from a current system time. Displaying an indicator, a visual clue, based on this information via the computer system can be helpful for avoiding unintended ignoring of a project and may remind a user to delete or archive projects, which are no longer in use. A range of possible indicators, obvious to those skilled in the art, is used to indicate the status of projects on a list.

Table 30, shown below, depicts a list of projects, where pie slice indicators are shown gradually disappearing when a user does not work on a project. Projects 2 and especially project 4, shown in table 30, have been in use recently, while projects 1 and 3 have not been in use for a long time. The time thresholds for considering projects ignored can optionally be set by a user.

TABLE 30

| | | |
|---|---|---|
| ◐ | Project 1 | 2002-09-20 |
| ◓ | Project 2 | 2002-12-23 |
| ◑ | Project 3 | 2003-04-01 |
| ● | Project 4 | 2002-08-22 |

Figure 5:
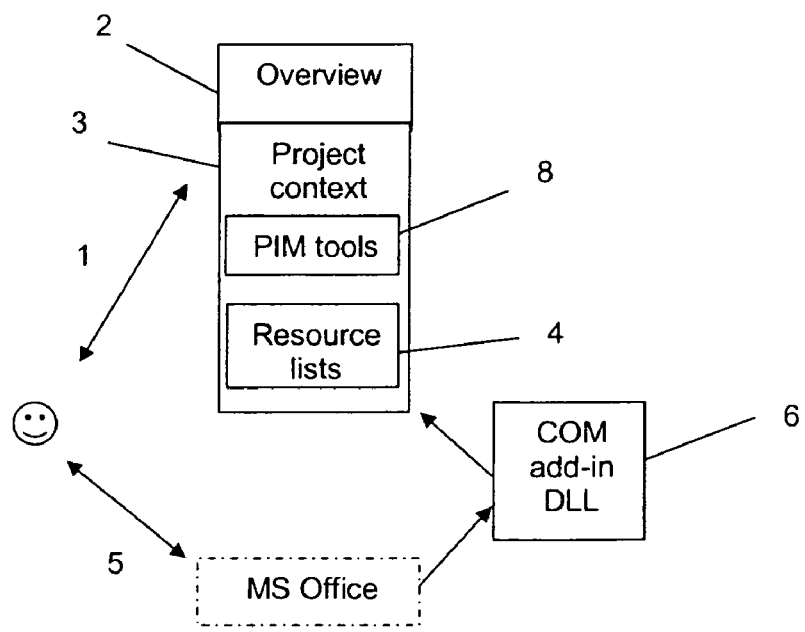
FIG. 5 schematically illustrates general system architecture, according to a third preferred embodiment of the present invention.

FIG. 5 depicts architecture of the computer system in accordance with a third preferred embodiment of the present invention. The difference between the architecture shown in FIG. 1 and the architecture shown in FIG. 5 is that the computer system provides a user with a number of PIM tools 8, such as a calendar, a To Do list, and a notepad. Entries in the PIM tools are linked to projects, which are active when the entries are made. A user is able to re-assign the entries to other projects, for instance, by clicking on an entry with the right mouse button and selecting a project from a pop-up menu. Also, a user has the option of making the default value of each entry being not related to any project. The entries in the calendar, as well as To Do lists and notes lists, which display entries related to several projects, are displayed in font color of their respective projects. For instance, when in a day view of the calendar a user makes several text entries, each of these entries has the color associated with the currently active project.

A user is able to switch between the maximized view, when all or many of the tools and functions provided by the computer system are displayed, and a minimized view, when only a limited amount of information is displayed.

Computer system inherent software makes it possible for a user to describe individual tasks within a certain project, called subtasks. A user is able to select one of these subtasks as active. Events in the interaction history in that case are tagged not only to projects but also to subtasks within these projects. A user selectively displays information related to an individual subtask by selecting this subtask. If no subtask is selected, then the information related to a project as a whole is displayed.

Figure 6:
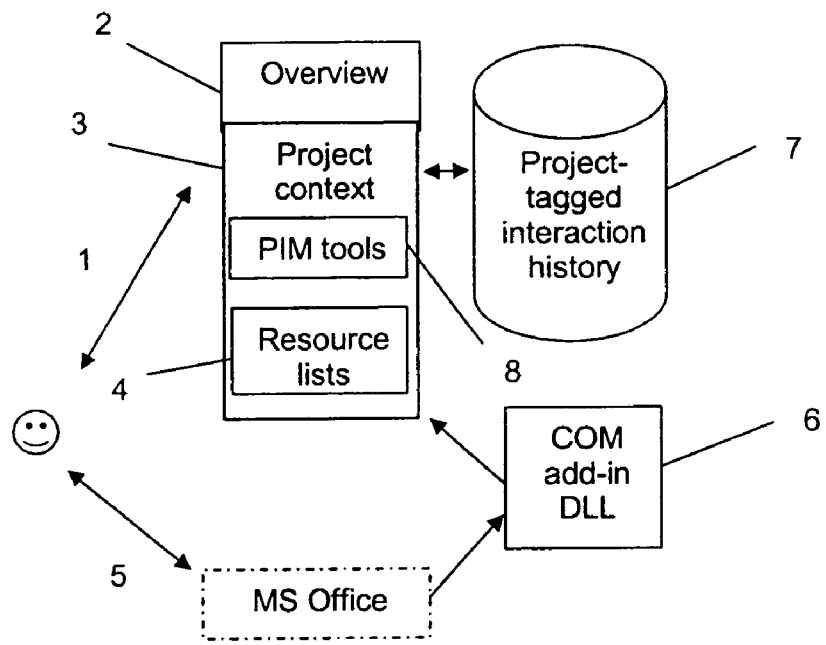
FIG. 6 schematically illustrates general system architecture, according to a fourth preferred embodiment of the present invention.

FIG. 6 depicts architecture of a computer system in accordance with the fourth preferred embodiment of the present invention. The difference between the architecture depicted in FIG. 1, FIG. 4, and FIG. 5, on the one hand, and the architecture depicted in FIG. 6, on the other hand, is that the computer system inherent software both (a) creates a database 7 containing a description of time-stamped events tagged to currently active projects and (b) is implemented so that it includes one or more of known personal PIM tools 8, such as a calendar.

Figure 7:
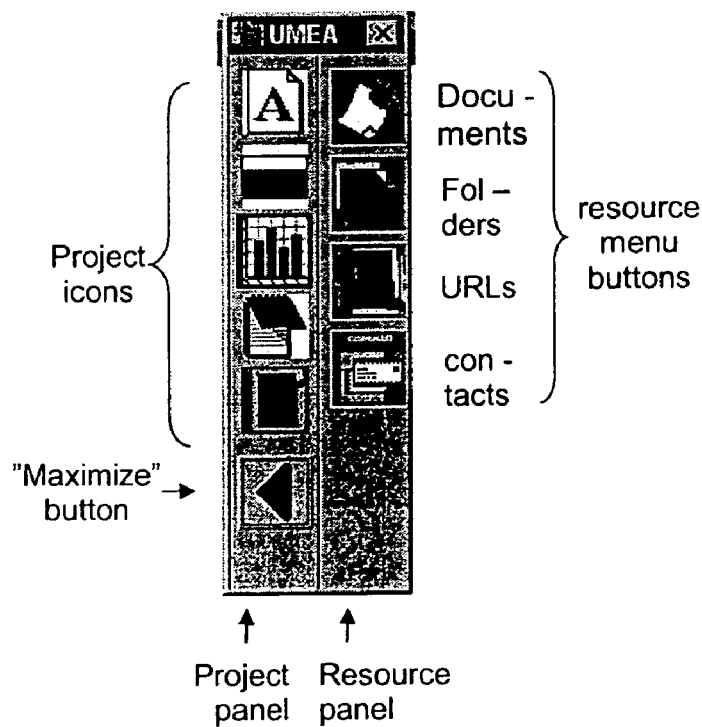
FIG. 7 schematically illustrates a user interface layout, according to a the fourth preferred embodiment of the present invention.

FIGS. 7-10 illustrate a user interface of a computer system in accordance with the fourth preferred embodiment of the present invention. A user is able to switch between three different graphical views of the computer system: the minimized overview, the maximized overview, and the project view. The minimized overview as schematically depicted in FIG. 7 displays two vertical panels: (a) the project panel showing project icons and the "maximize" button, and (b) the resource panel, showing pop-up menu buttons, corresponding to four types of project-specific resources: documents, folders, URLs, and contacts (email addresses).

Figure 8:
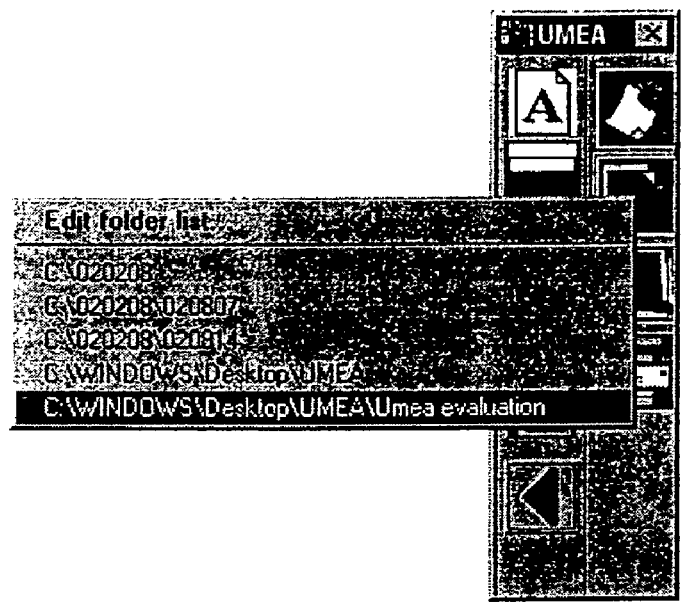
FIG. 8 schematically illustrates a user interface layout, according to the fourth preferred embodiment of the present invention.

Clicking on a button on the resource panel opens a pop-up menu displaying a list of resources related to the active project, shown schematically in FIG. 8.

Selecting an item on the menu opens a resource: a document, a folder, a web page, or a new email message addressed to the selected contact. The lists of resources can be edited. A user is able to manually add or delete items and assign ranks. Items are organized into groups according to their ranks. Groups with higher ranks are displayed closer to the top of the list.

The maximized overview as shown in FIG. 9 extends the minimized overview window by including: (a) a complete list of projects, (b) a PIM/History area displaying PIM tools and the interaction history of the active project, and (c) a control panel. In FIG. 9, PL stands for Project List, PIM/H—PIM/History area displaying a calendar, CP—Control Panel and RL is Resource List.

PIM entries are linked to projects. Information related to a certain date, such as deadlines of project or tasks described in To Do lists, is displayed in the calendar. In the month view and the week view they are indicated as bars of the color of their respective projects.

Figure 10:
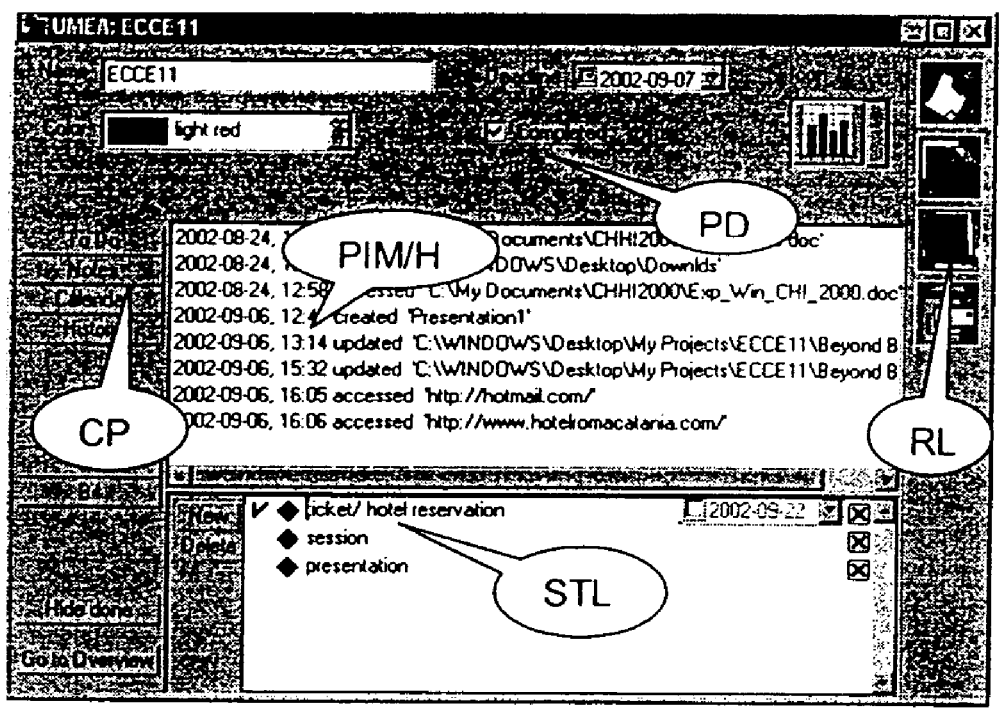
FIG. 10 schematically illustrates a user interface layout, according to the fourth preferred embodiment of the present invention.

The history, as shown in FIG. 10, is a project-specific interaction log, which contains time-stamped events describing objects, such as documents or folders, and actions, such as printing or accessing. The history is manually editable by a user. For instance, a user selects a sequence of events in project's interaction history and deletes it or re-assigns it to another project.

FIG. 10 also illustrates project views, which look similar to the maximized overview window, allowing a user to define attributes of a project, such as its name, associated color, icon, and deadline. It is also possible to decompose a project into subtasks. A project view window is displayed when a user creates a new project. When the project view window is opened first time it displays a default name, icon, and color associated with the project. Project-specific histories and resource lists are continuously updated in the same way regardless of whether an overview window or a project view window is displayed. In FIG. 10, PD stands for Project Details area, STL—Sub-Task List, PIM/H—PIM/History area displaying history, CP—Control Panel and RL is Resource List.

A user, in the fourth preferred embodiment of the invention, has the option of generating, through specially adapted software, a document, which contains information about a project. Information about project details and project related resources is stored in project descriptions and an interaction history database in a predetermined format or formats, therefore a person with an ordinary skill in programming can without an excessive effort create a computer program converting all or part of the information about project to a document that can be read and understood by a user. The document can be accessed, saved, or sent over a computer network as a separate information object. The document for example includes project name, project deadline, a description of project color, a description of project icon, a list of project's sub-projects with their respective deadlines, whether the project is completed or not, names of project-related files and folders, a list of project-related URLs, a list of project-related email addresses, headers of recent or all messages sent within the project, list of all or recent events in project's interaction history, a statistical description of project's interaction histories (e.g., how many hours have been spent on the project, how many documents created), project-related notes and To Do entries, or project-related calendar entries. Such a document is for example useful for self-reflection, reports, and travels. A user selectively defines types of information to be included into the human-readable generated project descriptions by selecting options in a way known to those skilled in the art.

In the fourth preferred embodiment of the invention, information in the interaction history database contains data about the projects a user has been working on during certain days, weeks, or months. This information is for example displayed directly in a calendar by coloring time units in the calendar, for example hours, days, weeks, or months, in the color of the projects active during that period of time. The area of a box in the calendar view is then proportional to the time spent on a certain project.

When a user resumes working on a project after a break, the user may find out that the collection of open resources, related to the project, is different from the collection of open resources, related to the project that was open at the moment immediately preceding the break. For instance, some windows, may be closed during the break. To help a user continue working on a project after a break, the fourth preferred embodiment of the present invention allows a user to restore a set of resources open immediately before the break by issuing a project workspace-restoration command. When a project becomes not active, for instance, when another project is selected or when a computer system according to the fourth preferred embodiment of the present invention is closed, the set of resources related to the first project, which are open when the project becomes not active, are saved in computer memory. When the project becomes active again, the user can issue a project workspace-restoration command, which opens the stored subset of project-related resources. In the present preferred embodiment the project workspace-restoration command only opens resources, which are not open at the moment of issuing the command. It is appreciated that a user can select an option, according to which a project workspace-restoration command is triggered by making a project active, so that the workspace-restoration command is executed each time a project becomes active.

The software solution utilized in the computer system allows a user to set a folder, called project folder, for the active project. The default option is creating a folder having the name of the project in the folder "MyProjects", which is located on the Desktop. Also, a user is able to select an existing folder as a project folder. When a project is active, its folder is the default folder for the "Save" command. For instance, if a project description is created, it is by default saved in a project folder. If a file is manually added to the folder, it appears on a project-related list of resources. The name of the project folder is placed on the list of project-related folders on the top, for example, right below the "Edit folder list" item, and is separated from the rest of the list by a delimiter. "Bring to project folder", or the like command opens a dialog window, in which a user defines, which project files should be moved or copied to the project folder. The window shows the files already in the folder and a list of project files, for example from the project Documents list, which are not located in the project folder.

The software solution utilized in the computer system also allows a user to set a work distribution folder containing resources that the user wants to synchronize with a Personal Digital Assistant (PDA) or another computerized device. The user issues a command that displays a dialog window containing a list of user's projects. The user indicates some of the projects. For the indicated projects the user selects subsets of folders and files to be synchronized and indicates whether these files and folders, or shortcuts to these files and folders, should be places in the work distribution folder. Also, the user selects a device, e.g., a specific PDA, an external memory device, or a remote memory storage. Then the "Synchronize" command is issued. If there is no work distribution folder for the selected device, the command creates a work distribution folder containing sub-folders having the names of the indicated projects. Each sub-folder also includes a system-generated project description. If there is a work distribution folder for the selected device, new items are added to the folder. If there are older versions of existing items in the work distribution folder, they are substituted with more recent versions. If new or more recent items exist in the work distribution folder, they are not changed. Instead, these items are added to lists of respective project-related resources. Besides, events describing detection of new or more recent items related to specific projects are added to an interaction history database. The work distribution folder is synchronized with other devices through existing synchronization means. Therefore, a user can more conveniently work on a project using a multiplicity of devices. For instance, if a user is creating a document on both a desktop computer and a PDA, a synchronization folder will help the user to copy necessary files to the PDA, and if the user modifies a document file using the PDA, the modified version will be added to project resources accessible on the desktop computer.

If a user regularly performs background tasks, such as checking the news on the web, he or she is able to inadvertently add irrelevant resources, such as the URL of the news website, to several foreground projects. According to the fourth preferred embodiment of the invention, a list of "background" resources is then set up, which are recognized as resources that should not be linked to any of the user's projects. Also, a user is able to mark certain resources as "ignored", so that they are not added to lists of project-related resources.

Many resources are used exclusively in one project or are modified only within a specific project. These resources, in the fourth preferred embodiment of the invention, are linked, or bound, to their respective projects, which can be done either automatically through the computer system software according to an algorithm (for instance, when a resource is assigned a rank exceeding a predetermined value, the resource is linked to a project), or manually by a user, via selecting a resource and marking it as a resource linked to a predetermined project. Using these resources indicates that a user is working on a certain project, even if the user does not explicitly indicate switching to that project. For instance, if a user is working on a document in one project context and then saves the latest version of the document in another context, means of the computer system, such as specially adapted software, is able to infer that the active project is indicated by mistake. The computer system means then switches to the correct project or, alternatively, displays a dialog window and lets the user select the correct project.

The description of the preferred embodiments illustrates the underlying ideas but the scope of the invention is however not limited only to the systems described above. A number of other possible implementations of the method and apparatus disclosed are possible within the scope of the attached set of claims. It should be noted that the methods described above are at a high-level and that they do not present low-level details obvious to those skilled in the art. The steps of the described methods are not necessarily executed in the order, in which they are described. Some steps can be omitted, while some other steps can be repeated more than once. It should be noted also that the term "computer system" and "computer monitor" are used in this disclosure in a broad sense. They refer to a wide variety of computational devices, such as desktop computers, laptop computers, personal digital assistance (PDA's), mobile phones, and so forth, as well as all types of screens, monitors, and displays used in computational devices to display information.

Means mentioned in the present description can be software means, hardware means or a combination of both.

The present invention has been described with non-limiting examples and embodiments. It is the attached set of claims that describe all possible embodiments for a person skilled in the art.

The invention claimed is:

1. A method providing low-overhead integrated support for project information management for a user of a computer system, comprising the method steps of:

creating a memory storage containing individual descriptions of each project listed in a group of projects of a user, each individual description comprising one or more properties, said properties selected from a group consisting of at least: a name, deadline, color, icon, status, importance, and urgency; said memory storage also containing descriptions of information objects related to each project listed in said group of projects; said information objects selected from a group consisting of at least: computer files and folders, computer applications, electronic documents and their parts, web pages, computer network addresses, electronic messages, computer network transmissions, computer network connections, computer device descriptions, computer preferences and settings, user identities, user profiles and accounts, computer system-generated reports and collections, user interface components, virtual reality objects, electronic images, computer models, and personal information management system entries;

selecting, through a user-performed action, one project of said group of user's projects as an active project;

detecting, through a first detecting means, an event generated by one of at least one computer application and at least one operating system when a user-action is carried out by the user with at least one information object, the user-action selected from a list consisting of at least: creating, deleting, activating, inactivating, selecting, deselecting, opening, closing, viewing, sending, downloading, uploading, accessing over network, sharing, archiving, printing out, playing, pausing, saving, copying, moving, modifying, or editing said at least one information object;

detecting, through a second detecting means, a project, which is active at the time when said event is generated;

detecting, through a third detecting means, whether at least one of the information objects described in said event is contained in a list of information objects related to said active project:

and if said at least one information object described in said event is not contained in said list of information objects related to said active project, then adding a description of said at least one information object to said list of information objects related to said active project;

viewing and editing lists of project-related information objects;

opening an information object from a list of project-related information objects;

whereby an organization and accumulation of information objects related to individual projects of the user is accomplished in the computer system, thus enabling the user to directly access project-related information objects when work on a project is resumed after an intermission.

2. A method according to claim 1, comprising detecting an event generated upon a user-action being carried out through first detecting means and through second detecting means further detecting which project is active when the event is generated and further comprising the step of:

creating an entry to a database containing interaction history, said entry comprising at least: the time of the event, type of user-action, information object or objects used, and the project, which is active at the time of the event;

whereby identifying a subset of entries in the interaction history database, linked to an individual project, enables the user to update, modify, or generate a list of information objects related to said individual project, through an updating, modifying, or generating means.

3. A method according to claim 2, comprising manual viewing and editing of entries in the interaction history database.

4. A method according to claim 2, further comprising editing of entries in the interaction history database through manual editing or algorithm-based processing; and storing both unedited and edited versions of the interaction history in a computer memory.

5. A method according to claim 2, further comprising the step of:

visualizing information in the interaction history database as statistical charts and timeline or timelines.

6. The method according to claim 2, further comprising the step of:

processing the interaction history database by converting a pre-processed sequence of three or more identical events into a processed sequence, said processed sequence containing the first and the last events of the pre-processed sequence.

7. A method according to claim 2, further comprising the steps of:

assigning ranks to project-related resources, wherein resources accessed with a frequency, which exceeds a predetermined value, are assigned a higher rank than a default rank assigned to a resource accessed once;

edited and saved documents, bookmarked web pages, manually entered URLs, answered messages, messages marked as important, renamed folders, and folders, in which files are saved, are assigned a still higher rank;

resources opened for less than a first predetermined amount of time are assigned a rank, lower than a default rank assigned to a resource accessed once, resources not used for more than a second predetermined amount of time are assigned a rank, lower than a default rank assigned to a resource accessed once, selectively displaying resources with predetermined ranks as directly displayed on lists of project-related resources and other resources being displayed, indirectly, if an additional operation is carried out; and setting options for directly and indirectly displaying project-related resources with different ranks.

8. A method according to claim 2, comprising manual viewing and editing of a part of the interaction history database related to an indicated project-related resource, such as a file, a computer folder, a URL, a message, or an email address, said part of the interaction history database displayed as a text, a statistical chart, or timeline diagram representing the use of the said indicated resource in one or several projects.

9. A method according to claim 2, further comprising the step of:

displaying visual clues indicating for how long individual projects are not active.

10. A method according to claim 1, further comprising the step of:

providing a personal information management system comprising tools selected from the group consisting of at least: a calendar, To Do lists, and notes; wherein entries to the personal information management system are linked to projects, which are active when the entries are being made.

11. A method according to claim 1, further comprising the step of:

displaying one of a minimized and a maximized view of project description and personal information management tools; and switching between the minimized view and the maximized view selectively at command.

12. A method according to claim 10, further comprising the step of:

displaying project-related information in a calendar in a color associated with a given project.

13. A method according to claim 10, comprising manually creating a description of a project and further comprising the steps of creating a description of parts of the project or subtasks; and marking one of the subtasks as the active subtask.

14. A method according to claim 13, further comprising the steps of:

relating project-related information objects and personal information management system entries to specific subtasks, which are active when said resources are used and said entries are made; and if no subtask is selected, then displaying all project-related information objects and personal information management system entries, and if a subtask is selected, then displaying only those project-related information objects and personal information management system entries, which are related to the said subtask.

15. A method according to claim 1, further comprising the steps of:

providing personal information management tools selected from the group consisting of at least: a calendar, To Do lists, and notes; wherein entries to said personal information management system are linked to projects, which are active when said entries are being made; and creating an entry to a database containing interaction history when a user-action is carried out with an information object, wherein said entry at least comprises one of: time of the event, type of user-action, information object or objects used, and the project which is active at the time of the event.

16. A method according to claim 1, further comprising the steps of:

generating through document generating means a document containing a description of a specific project, said project description containing information types selected from a group consisting of at least: a project name, a project deadline, a description of project color, a description of a project icon, a list of a project's sub-projects with their respective deadlines, whether the project is completed or not, names of project-related files and folders, a list of project-related URLs, a list of project-related email addresses, headers of recent or all messages sent within the project, a list of all or recent events in project's interaction history, a statistical description of project's interaction histories, project-related notes and To Do entries, project-related calendar entries; and selectively defining which types of information to be included in a project description.

17. A method according to claim 15, further comprising the step of:

coloring areas of a calendar view representing time units, such as days, weeks, or months, of a predetermined period in the past with colors associated with the projects worked on during said time units, wherein the proportion of the area colored in a project's color is substantially proportional to the amount of time spent on that project.

18. A method according to claim 1, further comprising the steps of:

detecting the subset of project-specific resources of an active project, which are open at the moment when the project becomes not active; and storing a description of the subset of project-related information objects in a computer memory; and when the project becomes active again, providing means for opening the subset of project-related information objects corresponding to said memory-stored description.

19. A method according to claim 1, further comprising the steps of:

creating an at least one computer folder; and moving or copying all or part of project-related computer files and folders to said at least one computer folder, or placing shortcuts to all or part of project-related files and folders to said at least one computer folder.

20. A method according to claim 15, further comprising the step of:

organizing all or part of project-related information objects related to one or more projects, copies of the information objects, or links to the information objects, in at least one predetermined computer folder for subsequent distribution of work between several devices, which at least one work distribution computer folder is then copied to a memory storage device, sent over a computer network, or synchronized with another computing device; and wherein the work on a project is coordinated employing a variety of computer devices.

21. A method according to claim 20, further comprising the steps of:

detecting if new information objects have been added to existing information objects or updated in at least one work distribution computer folder; and if there are new or updated information objects in the at least one work distribution computer folder, then adding, creating or updating events to an interaction history database and updating lists of project-related information objects.

22. A method according to claim 1, further comprising the steps of:

organizing project-related information objects into sets, the sets being selected from the group consisting of at least: applications, documents, folders, URLS, messages, and contacts; and viewing and editing the sets separately.

23. A method according to claim 1, further comprising the step of:

indicating a set of information objects, which information objects should be ignored and not added to lists of project-related information objects when a user-action involving one or more information objects from the set of information objects is carried out.

24. A method according to claim 1, further comprising the steps of:

marking a project-related information object or information objects as bound to a specific project; and activating the specific project when a bound information object is selected.

25. A method according to claim 24, comprising marking a project-related information object or information objects as bound to a specific project and further comprising the step of:

displaying, when a bound information objects is selected, a dialog window and providing means for selecting at least one of: (a) making the project, to which the bound information object is linked, active, (b) accessing the bound information object without making changes as to which project is active, and (c) canceling access to the bound information object.

26. A method according to claim 1, further comprising the steps of:

assigning ranks to project-related information objects; and displaying lists of project-related information objects, so that information objects having the same rank are displayed as grouped together.

27. A method according to claim 1, wherein items on lists of project-related information objects are displayed as objects located in a two-dimensional or three-dimensional space.

28. An apparatus for providing low-overhead integrated support for information management to a user of a computer system, comprising:

memory-storage creating means for creating memory storage containing descriptions of a group of projects, wherein the descriptions comprise one or more properties, wherein the properties are selected from a group consisting of at least: a name, deadline, color, icon, status, importance, and urgency; said memory storage containing a description of information objects related to the project in a list of project-related resources; said information objects being of a type selected from a group consisting of at least: computer files and folders, computer applications, electronic documents and their parts, web pages, computer network addresses, electronic messages, computer network transmissions, computer network connections, computer device descriptions, computer preferences and settings, user identities, user profiles and accounts, computer system-generated reports and collections, user interface components, virtual reality objects, electronic images, computer models, and personal information management system entries;

means for indicating one project from the group of projects as an active project;

first detecting means for detecting an event generated by one of at least one computer application and at least one operating system when a user-action is carried out with an information object, the user-action is selected from a list consisting of at least: creating, deleting, activating, inactivating, selecting, deselecting, opening, closing, viewing, sending, receiving, downloading, uploading, accessing over network, sharing, archiving, printing out, playing, pausing, saving, copying, moving, modifying, or editing said information object;

second detecting means for detecting a project, which is active at the time when said event is generated;

third detecting means for detecting whether at least one of information objects described in said event is contained in a list of project-related resources associated with said active project;

and if said at least one information object described in said event is not contained in said list of information objects related to said active project, then adding a description of said at least one information object to said list of information objects related to said active project;

means for viewing and editing lists of project-related information objects; and means for opening an information object from a list of project-related information objects.

29. An apparatus according to claim 28, further comprising:

personal information management system tools selected from the group consisting of at least: a calendar, To Do lists, and notes; wherein entries to the personal information management system are linked to projects, which are active at the time the entries are being made.

30. An apparatus according to claim 28, further comprising:

means for creating an entry to a database containing an interaction history when a user-action is carried out, wherein the entry comprises at least: the time of the event, type of user-action, information object or objects used, and the project, which is active at the time bf the event.

31. An apparatus according to claim 30, further comprising:

means for viewing and editing entries in the interaction history database.

32. An apparatus according to claim 28, further comprising:

means for detecting the subset of project-specific information objects of an active project, which are open at the moment when the project becomes not active;

means for storing a description of the subset of project-related information objects in a computer memory; and when the project becomes active again, providing means for opening the subset of project-related information objects corresponding to the memory-stored description.

33. An apparatus according to claim 28, further comprising:

means for creating at least one computer folder linked to a certain project and moving or copying all or part of project-related files to said at least one computer folder, or placing shortcuts to all or part of project-related files to said at least one computer folder.

34. An apparatus according to claim 28, further comprising:

means for creating a memory storage and storing all or part of information objects related to one or several projects in said storage;

means for copying, moving, or sending information contained in said storage to another memory storage, another computing device, or over a computer network; and wherein the user can store and access information necessary for working on a project or projects while employing a variety of computer devices.

* * * * *